US010156308B2

(12) United States Patent
Nezu

(10) Patent No.: US 10,156,308 B2
(45) Date of Patent: Dec. 18, 2018

(54) CONNECTOR

(71) Applicant: NIFCO INC., Yokohama-shi, Kanagawa (JP)

(72) Inventor: Mikio Nezu, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 824 days.

(21) Appl. No.: 14/413,611

(22) PCT Filed: Jul. 9, 2013

(86) PCT No.: PCT/JP2013/004253
§ 371 (c)(1),
(2) Date: Jan. 8, 2015

(87) PCT Pub. No.: WO2014/010235
PCT Pub. Date: Jan. 16, 2014

(65) Prior Publication Data
US 2015/0176738 A1 Jun. 25, 2015

(30) Foreign Application Priority Data

Jul. 9, 2012 (JP) .................................. 2012-153304

(51) Int. Cl.
F16L 37/14 (2006.01)
F16L 37/088 (2006.01)

(52) U.S. Cl.
CPC .......... F16L 37/088 (2013.01); F16L 37/144 (2013.01)

(58) Field of Classification Search
CPC .............................. F16L 37/088; F16L 37/144
(Continued)

(56) References Cited

U.S. PATENT DOCUMENTS 3,753,582 A    8/1973   Graham
7,516,989 B2 * 4/2009   Yoshida ................. B29C 65/08
                                                         285/321
(Continued)

FOREIGN PATENT DOCUMENTS

JP    H07-032346 U    6/1995
JP    2001-289381 A   10/2001
(Continued)

OTHER PUBLICATIONS

PCT, "International Search Report far PCT/JP2013/004253", dated Sep. 17, 2013.
(Continued)

Primary Examiner — Aaron M Dunwoody
Assistant Examiner — Fannie C Kee
(74) Attorney, Agent, or Firm — Manabu Kanesaka

(57) ABSTRACT

A connector includes a cylindrical connector housing having through-holes extending in a circumferential direction formed on right and left, a cylindrical male member to be entered into the connector housing and having a circumferential groove conforming with the through-holes in a state wherein the male member enters into the connector housing; and an elastic lock member including an intermediate portion, and right-and-left leg portions projecting to right and left from the intermediate portion to be received into the through-holes. Sliding inclined surfaces to be engaged with loose ends of the leg portions of the lock member are provided on an outer periphery of the connector housing. The lock member takes an engagement position where the leg portions enter into the circumferential grooves from the through-holes; and a release position where the leg portions escape toward the through-holes from the circumferential groove.

9 Claims, 6 Drawing Sheets

(58) Field of Classification Search
USPC .................... 285/321, 305, 308, 310, 313
See application file for complete search history.

(56) References Cited

U.S. PATENT DOCUMENTS

| | | |
|---|---|---|
| 2003/0052484 A1 | 3/2003 | Rautureau |
| 2004/0051313 A1 | 3/2004 | Trouyet |
| 2005/0063125 A1* | 3/2005 | Kato .................... F16B 1/0071 361/113 |
| 2005/0161946 A1* | 7/2005 | Bauer .................. F16L 37/088 285/305 |
| 2007/0059972 A1 | 3/2007 | Rigollet et al. |
| 2012/0056420 A1* | 3/2012 | Fansler ................ F16L 37/088 285/317 |

FOREIGN PATENT DOCUMENTS

| | | |
|---|---|---|
| JP | 2002-267071 A | 9/2002 |
| JP | 2006-266472 A | 10/2006 |
| WO | 2008/153510 A1 | 12/2008 |

OTHER PUBLICATIONS

Europe Patent Office, "Search Report for EP 13816610.3," dated Feb. 4, 2016.

* cited by examiner derivedCONNECTOR

RELATED APPLICATIONS

The present application is National Phase of International Application No. PCT/JP2013/004253 filed Jul. 9, 2013, and claims priority from Japanese Application No. 2012-153304, filed July, 2014, the disclosure of which is hereby incorporated by reference herein in its entirety.

FIELD OF TECHNOLOGY

The present invention relates to a connector used for a connection of a fluid piping, and especially relates to a connector which can quickly and reliably carry out a connection of a piping for automobiles.

BACKGROUND ART

A connector generally has a structure such that a connector housing and a pipe body (a male member) can be engaged and released by operating a wire retainer (a lock member). For example, as shown in Patent Document 1, the connector is formed by the connector housing and the wire retainer (the lock member). Also, there is provided an engagement slit (a through-hole) in a retainer attachment portion of the connector housing, and one portion of the wire retainer enters into the engagement slit, and projects into the retainer attachment portion. In that state, when the pipe body (the male member) is inserted, the wire retainer engages an outer peripheral groove of the pipe body to be locked. At a time of a release, the wire retainer is pulled upwardly (Patent Document 1).

PRIOR ART DOCUMENT

Patent Document

Patent Document 1: Japanese Unexamined Patent Application Publication No. 2006-266472

SUMMARY OF THE INVENTION

Problems to be Solved by the Invention

In a case of the conventional Patent Document 1, however, the connector has the structure of releasing the wire retainer (the lock member) by operating the wire retainer (the lock member) to pull upwardly, so that a projection allowance (an operation stroke) of the wire retainer is large, and in a narrow space, a work is difficult. Also, it is necessary to have an interval between the wire retainer and an adjacent part so as not to be suitable for an engine room of an automobile and the like where a close arrangement is required. Moreover, there is also a case wherein a tool is necessary for the release so as to have a problem for workability. Also, there is a risk of damaging another part by the tool as well.

Also, in a case wherein the connector is removed after unlocking, the wire retainer (the lock member) remains extended so as to have a risk of interfering with another part.

The present invention is made in view of the aforementioned inconveniences, and an object of the present invention is to provide a connector comprising the connector housing; the male member mounted on the connector housing; and the lock member, and releasing an engagement state by pressing the lock member.

Means for Solving the Problems

The present invention has the following contents.

(1) In order to obtain the aforementioned object, the present invention is a connector comprising a cylindrical connector housing in which a through-hole extending in a circumferential direction is provided on the right and left; a cylindrical male member including an opposing end including a tapered portion to be entered into an opposing end of the connector housing, and including circumferential grooves conforming with the through-hole in a state wherein the opposing end of the connector housing is entered in; and an elastic lock member including an intermediate portion, and both right-and-left leg portions projecting to the right and left from the intermediate portion to be received into the through-hole. On an outer periphery of the connector housing, there is provided sliding inclined surfaces to be engaged with loose ends of both leg portions of the lock member, and the lock member can take an engagement position where the loose ends of both leg portions are positioned in proximal positions of the sliding inclined surfaces, and both leg portions enter into the circumferential grooves inward from the through-hole; and a release position where the loose ends of both leg portions are positioned in distal positions of the sliding inclined surfaces, and respectively spread to open both leg portions against an elastic force of the lock member, and both leg portions escape into the through holes from the circumferential groove.

An embodiment of the present invention is as follows.

(2) The lock member is formed by a metal wire rod having elasticity.

(3) On the outer periphery of the connector housing, there is provided a holding wall controlling an axial direction displacement of the lock member.

(4) The intermediate portion of the lock member includes a portion bent in such a way as to project in an axial direction.

(5) The respective leg portions of the lock member include portions bent in the axial direction.

(6) On the outer periphery of the connector housing, there are provided inclined walls projecting from the outer periphery and defining the sliding inclined surfaces; and side walls connecting both side portions of the inclined walls to the outer periphery.

(7) The sliding inclined surface has a curved surface.

Effect of the Invention

According to the present invention, a release operation can be carried out by a one-touch operation, and a projection does not occur. Also, the connector can be closely installed by reducing an interval between the connector and an adjacent part. Moreover, a release by a tool is unnecessary, and there is no risk of scratching a surrounding part by the tool. Also, when the connector is unlocked and removed, the projection of the lock member does not interfere with another part.

Also, if the sliding inclined surface formed in the U-shaped wall is the curved surface, a pressing force for the release operation can be freely set.

Also, if the lock member is positioned on a top portion of the sliding inclined surface in a state of being engaged with an engagement portion formed on an outer periphery of the male member in an unloaded state, a large force is necessary at the beginning of the release operation so as to prevent from being carelessly released.

Also, if the lock member is formed by the metal wire rod having the elasticity, an engagement strength can be increased. Also, a die is unnecessary so as to reduce a manufacturing cost. Moreover, there is no creep deformation so as to obtain a stable engagement strength.

Also, if the lock member is formed to be bilaterally symmetric, and the sliding inclined surface formed in the U-shaped wall is also disposed in a bilaterally symmetric position of the connector housing, and the lock member spreads to open by pressing a top portion of the lock member so as to release an engagement with the engagement portion formed on the outer periphery of the male member, the engagement can be released by a one-touch operation.

BEST MODES OF CARRYING OUT THE INVENTION

A connector of the present invention comprises a connector housing; a male member mounted on the connector housing; and a lock member. The connector housing includes a lock-member holding wall formed on an outer periphery; a U-shaped wall with a nearly U-shaped cross section including a sliding inclined surface where a tip portion of the lock member slides; and a through-hole through which one portion of the lock member held by the lock-member holding wall passes, and which is formed to engage with an engagement portion formed on an outer periphery of the male member mounted on the connector housing. The lock member engages with the engagement portion formed on the outer periphery of the male member by an elastic force in an unloaded state, and is released from the engagement portion formed on the outer periphery of the male member by applying a pressing load so as to be operated by a one-touch operation and eliminate a projection size.

First Embodiment

Figure 1:
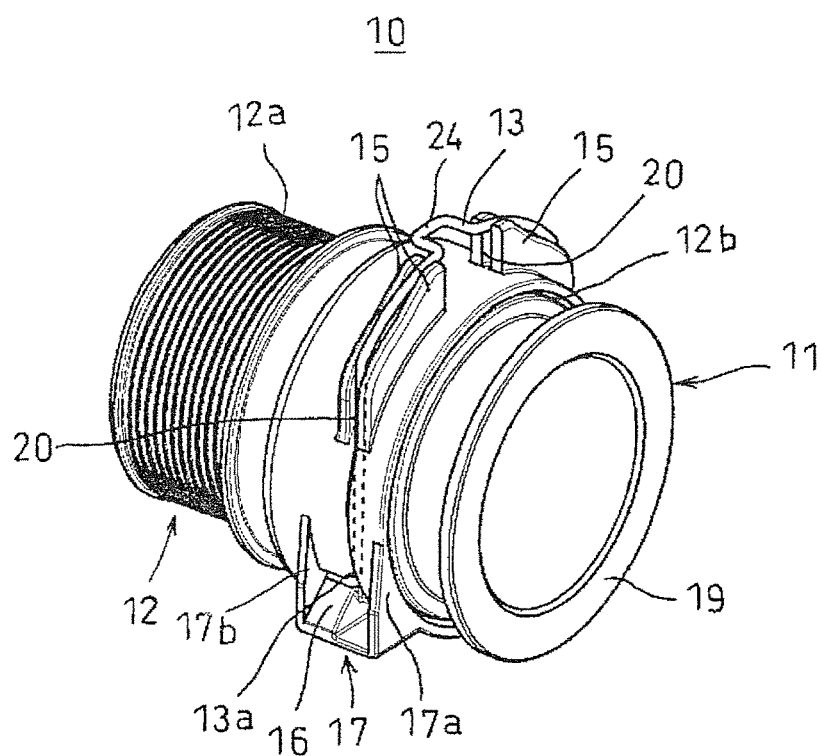
FIG. 1 is a perspective view showing a connection state of a connector showing one embodiment of the present invention.
Figure 2:
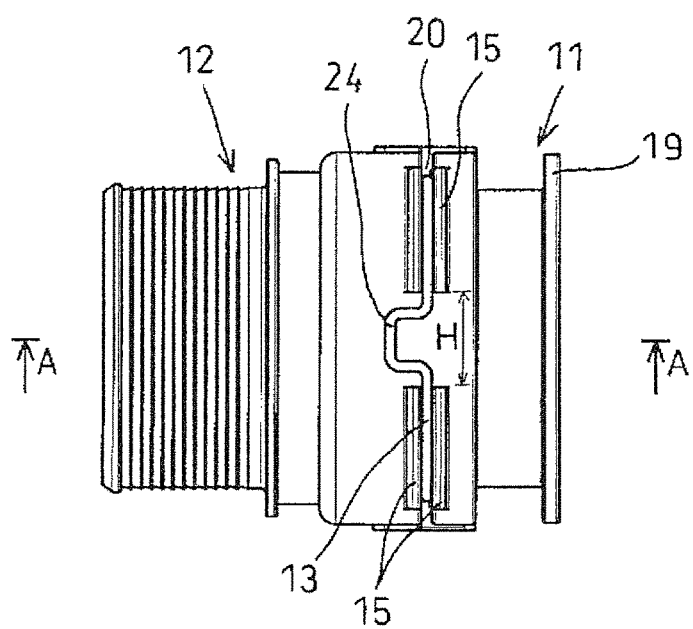
FIG. 2 is a plan view of the same connector.
Figure 3:
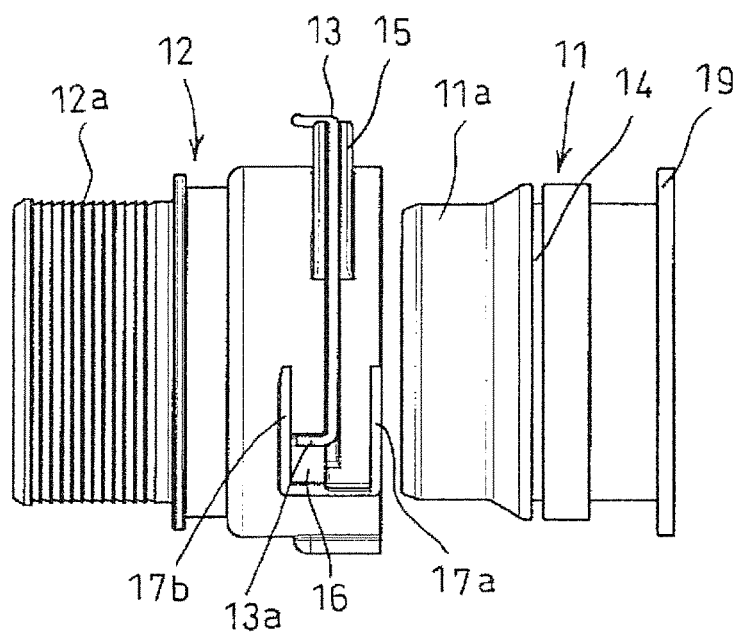
FIG. 3 is a side view showing a separated state of the same connector.
Figure 4:
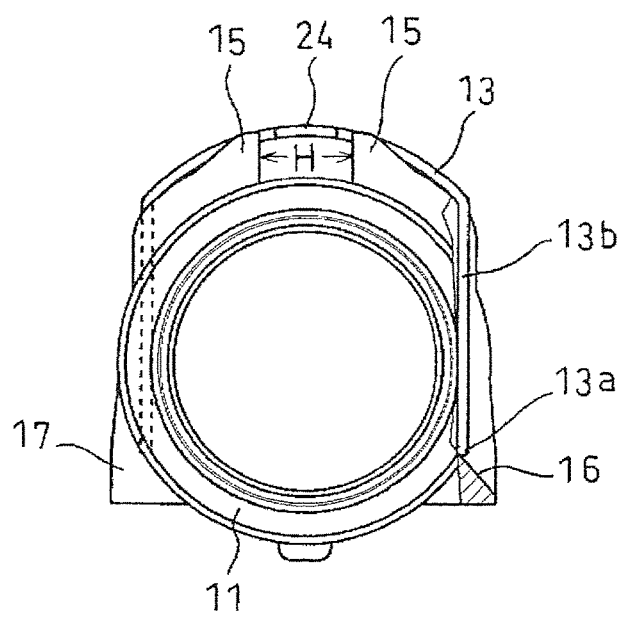
FIG. 4 is a front view in which one portion of the same connector is cut.

Hereinafter, the present invention will be explained in detail based on the drawings showing one embodiment. FIG. 1 is a perspective view showing a connection state of the connector showing one embodiment of the present invention; FIG. 2 is a plan view of the connector of the present invention; FIG. 3 is a side view of the connector of the present invention; and FIG. 4 is a front view in which one portion of the connector of the present invention is cut. Here, a connector 10 comprises a cylindrical connector housing 12 in which a hose is connected to one end, and a male member 11 is mounted on the other end (an opposing end); the male member 11 in which the hose is connected to one end, and the other end (the opposing end) is mounted on the connector housing 12; and a lock member 13 which can engage and disengage between the connector housing 12 and the male member 11. The male member 11 includes an engagement groove 14 which is an engagement portion with which a leg portion 13b of the lock member 13 engages on an outer periphery. The connector housing 12 includes lock-member holding walls 15 formed on an outer periphery; a U-shaped wall 17 with a nearly U-shaped cross section including a sliding inclined surface 16 where a tip portion 13a of the lock member 13 slides; and a through-hole 18 through which one portion of the lock member 13 held by the lock-member holding walls 15 passes, and which is formed to engage with the engagement groove 14 formed on the outer periphery of the male member 11 mounted on the connector housing 12. Incidentally, the engagement groove 14 may be an engagement step portion.

The male member 11 is formed by, for example, a synthetic resin and the like, has a cylindrical shape, and includes a flange 19 at a base end portion to which the hose is connected, and there is formed the engagement groove 14 on the outer periphery of an approximately intermediate portion. Also, a tip portion 11a mounted on the connector housing 12 is formed to be tapered, and a diameter of the tip portion 11a is enlarged in a conical shape just before the engagement groove 14.

The connector housing 12 includes a hose connecting portion 12a wherein the hose is connected to one end; and a mounting opening 12b wherein the male member 11 is mounted on the other end. The connector housing 12 is formed by, for example, the synthetic resin and the like. Also, on an outer periphery of the hose connecting portion 12a, there is included a plurality of annular concave and convex portions for preventing a hose from coming off. Also, at an outer peripheral top portion of the mounting opening 12b whose diameter is enlarged, there are formed the lock-member holding walls 15 on the right and left including a hollow H at a center. The lock-member holding wall 15 includes a holding groove 20 which can slidably hold the lock member 13. Moreover, on the outer periphery of the connector housing 12, there is formed the through-hole 18 through which the leg portion 13b of the lock member 13 held by the lock-member holding wall 15 can pass so as to engage with the engagement groove 14 formed on the outer periphery of the male member 11 mounted on the connector housing 12.

Also, on the outer periphery of the connector housing 12 and at symmetrical positions, there are formed the U-shaped walls 17 including the sliding inclined surfaces 16. The U-shaped wall 17 is positioned below the lock-member holding wall 15, and is disposed such that the tip portion 13a of the lock member 13 held by the lock-member holding wall 15 abuts against the sliding inclined surface 16. Also, the U-shaped wall 17 includes a pair of side walls 17a and 17b along a tangential direction of the outer periphery of the connector housing 12, and there is formed the sliding inclined surface 16 between the side walls 17a and 17b. In the present embodiment, as shown in FIGS. 1, 3, and 4, the sliding inclined surface 16 is formed as a flat surface inclined in a direction of separating from the connector housing 12 downward.

At a deep end of the mounting opening 12b of the connector housing 12, there are disposed an O-ring 21 and a backup ring 22 holding the O-ring 21 to ensure water-tightness and an air-tightness between the connector housing 12 and the mounted male member 11. The backup ring 22 is formed by the synthetic resin and the like, and is fixed to an inner wall of the connector housing 12 by a claw member which is not shown in the drawings or welding. Incidentally, a seal member is not limited to the O-ring, and may be another seal member such as a V-ring, an X-ring, or the like.

Figure 7:
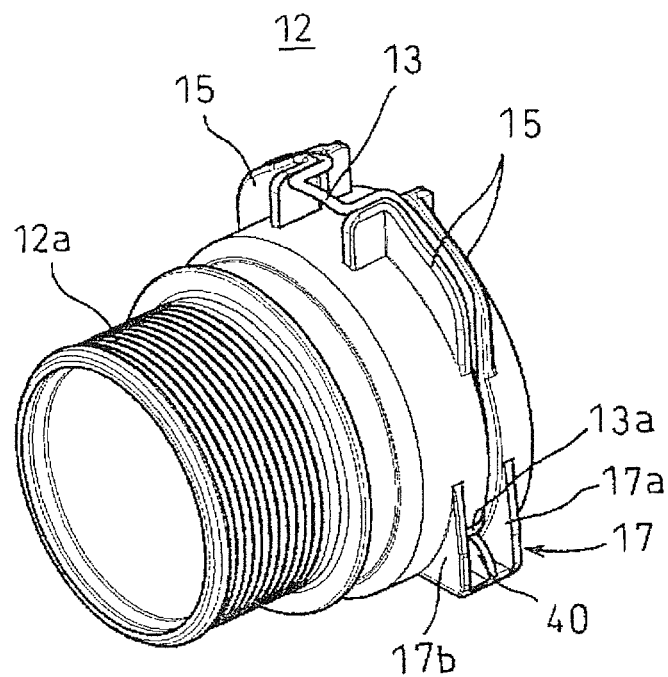
FIG. 7 is a perspective view showing another embodiment of the same connector.

FIG. 7 is a perspective view showing another embodiment of the connector of the present invention. In the present embodiment, a sliding inclined surface 40 formed in the U-shaped wall 17 has a curved surface convexed in an upper direction. In a case of being formed in this manner, when the lock member 13 is operated, at first, a large force is required (firmly), and then, gradually, the lock member 13 can be operated with a small force (weakly). Therefore, the lock member 13 can be prevented from being carelessly released.

Figure 8:
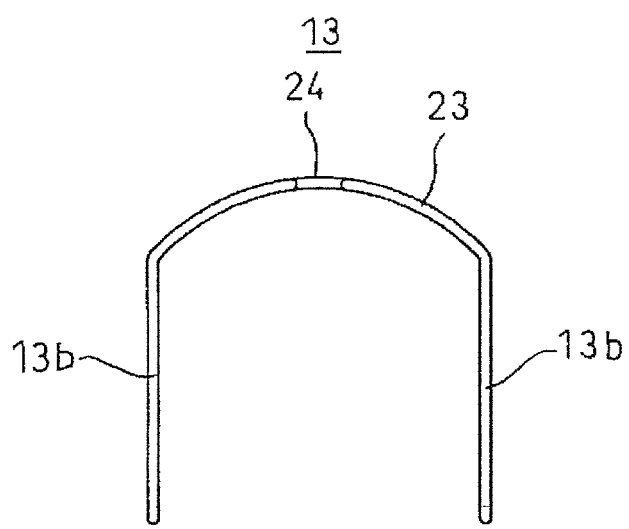
FIG. 8 is a front view of a lock member used for the same connector.
Figure 9:
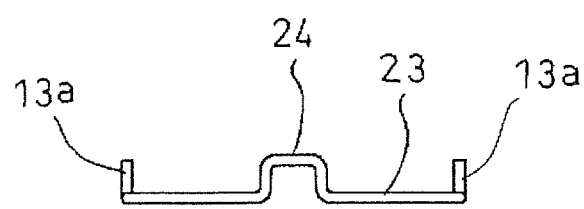
FIG. 9 is a plan view of the same lock member.
Figure 10:
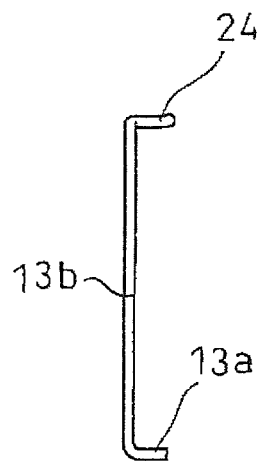
FIG. 10 is a side view of the same lock member.

As shown in FIGS. 8 to 10, the lock member 13 is formed by an elastic wire rod, for example, made of metal formed by being bent in such a way as to provide a connection portion 23 curved in a convex shape upward; leg portions 13b linearly extending in parallel to each other respectively from both sides (width-direction both sides) of the connection portion 23; and tip portions 13a formed by being bent in a direction orthogonal to the leg portions at tips of the leg portions 13b. Also, at a top portion of the connection portion 23, there is formed a U-shaped operation portion 24 bulging in the tangential direction of the connector housing 12. Moreover, the operation portion 24 has a size smaller than that of the center hollow H of the lock-member holding wall 15 formed in the connector housing 12. Also, a diameter of the leg portion 13b is smaller than a width of the through-hole 18, so that the leg portion 13b can pass through the through-hole 18. A length of the leg portion 13b is formed to be longer than a length (a height) of the through-hole 18. Incidentally, the lock member 13 may be a plate material made of metal or made of synthetic resin. Namely, the lock member 13 is not limited to the wire rod, and even if the lock member 13 is formed by a long and narrow plate material, the same effect can be obtained.

Figure 11:
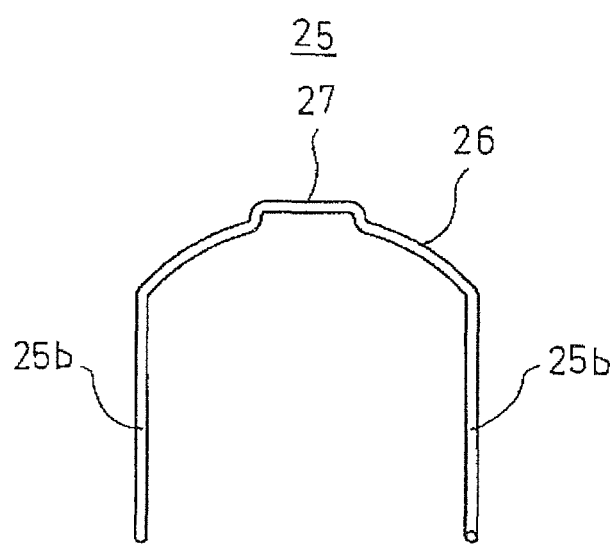
FIG. 11 is a front view showing another embodiment of the lock member used for the same connector.
Figure 12:
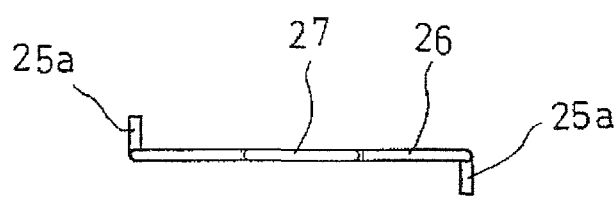
FIG. 12 is a plan view of the same lock member.
Figure 13:
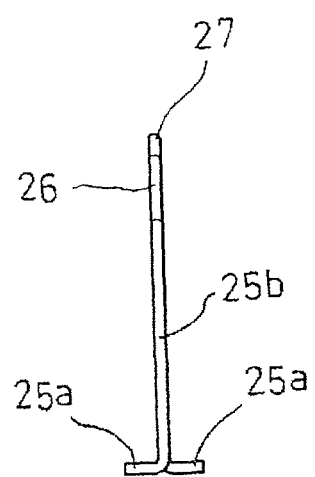
FIG. 13 is a side view of the same lock member.

FIGS. 11 to 13 show another embodiment of the lock member 25. In the present embodiment, the lock member 25 includes a connection portion 26 curved in a convex shape upward; leg portions 25b linearly extending in parallel to each other respectively from both sides (width-direction both sides) of the connection portion 26; and tip portions 25a formed by being bent in a direction orthogonal to the leg portions at tips of the leg portions 25b, and the lock member 25 is formed by an elastic wire rod made of metal. Also, at a top portion of the connection portion 26, there is formed a linear operation portion 27. Also, the tip portions 25a are bent respectively in opposite directions on the right and left.

In a case wherein the lock member 25 is formed in such a manner, an arrangement of the tip portions 25a is not bilaterally symmetric, so that when the lock member 25 is attached to the connector housing 12, the lock member 25 can be attached to the connector housing 12 from any direction so as to realize an efficient assembling work. An operation for releasing a lock state is carried out by pressing the operation portion 27 so as to be the same as that of the first embodiment.

Figure 5:
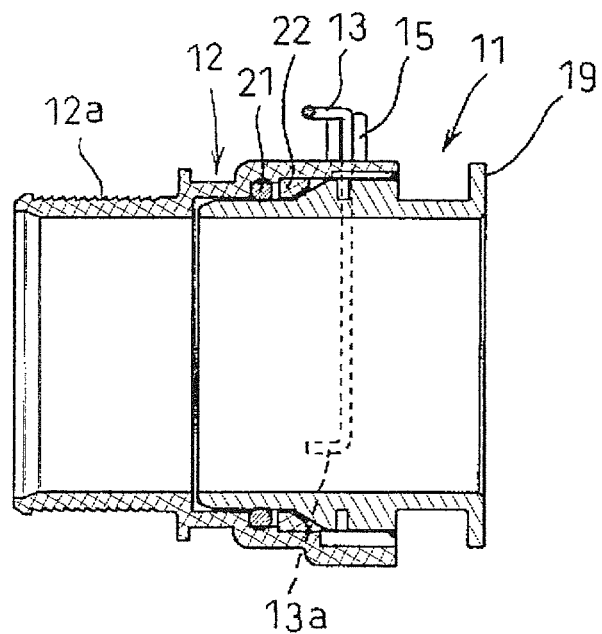
FIG. 5 is a cross-sectional view taken along a line A-A in FIG. 2.
Figure 6:
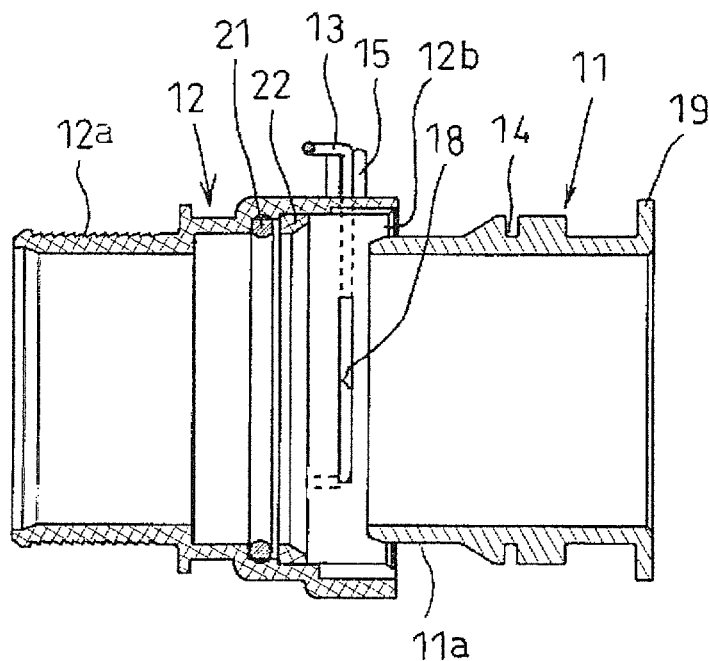
FIG. 6 is a cross-sectional view showing the separated state of the same connector.

In a case of assembling the connector 10 formed in such a manner, at first, the lock member 13 is attached to the connector housing 12 from the upper direction. As for an attachment procedure of the lock member 13, when the leg portions 13b are inserted into the holding groove 20 of the lock-member holding walls 15 in such a way as to open the leg portions 13b to the right and left, and are released, the tip portions 13a reach a top portion of the sliding inclined surface 16 by an elastic force of the wire rod. Also, in the present embodiment, the tip portions 13a of the lock member 13 are attached toward a direction of the hose connecting portion 12a of the connector housing 12. One portion of the attached leg portion 13b projects into the mounting opening 12b from the through-hole 18 of the connector housing 12. In that state, as shown in FIGS. 3 and 6, when the male member 11 is mounted from the mounting opening 12b, the tapered tip portion 11a and the portion whose diameter is enlarged in the conical shape just before the engagement groove 14, press and spread the leg portions 13b in an outer peripheral direction, and then, the leg portions 13b engages the engagement groove 14. In a state wherein the leg portions 13b are engaged with the engagement groove 14, as shown in FIG. 5, the O-ring 21 is positioned between an outer periphery of the tip portion 11a of the male member 11 and an inner periphery of the mounting opening 12b of the connector housing 12, and is pressed so as to hold water-tightly or air-tightly.

In a case wherein an engagement between the male member 11 and the connector housing 12 is released, the operation portion 24 of the lock member 13 is pressed from above, so that the tip portions 13a descend along the sliding inclined surface 16, and the leg portions 13b spread to open to the right and left. By the spreading of the leg portions 13b, the leg portions 13b come out of the engagement groove 14 of the male member 11, and the engagement is released so as to pull out the male member 11. Also, the tip portion 13a is surrounded by the side walls 17a and 17b from the front and back in an axial direction of the connector housing 12 so as to prevent a deformation and the like of the tip portion 13a by an unintended external force and to reliably perform a release operation. Thus, in the present invention, the operation can be carried out only by pressing the operation portion 24 of the lock member 13 from above so as to be unlocked even in a narrow place without a space for projecting.

Thus, in the connector 10 of the present invention, even in a narrow space, the operation can be easily carried out, and there is no projecting portion, so that in a case of being removed, there is no risk of scratching another part as well. Also, a tool is not required at a time of a release so as not to scratch parts by the tool.

Incidentally, an example in which shapes of the sliding inclined surfaces 16 and 40 are the flat surface, and the curved surface convexed in the upper direction has been explained; however, the shapes may be a shape of a curved surface concaved in the upper direction, or a shape wherein a curvature of the curved surface changes.

The connector of the present invention can be used for a water system piping of a radiator of construction machinery, or for an air system piping of an intercooler and the like as the connector for a large diameter pipe.

EXPLANATION OF SYMBOLS 10 a connector
11 a male member
11a a tip portion 12 a connector housing
12a a hose connecting portion
12b a mounting opening
13 a lock member
13a a tip portion
13b a leg portion
14 an engagement groove (engagement portion)
15 a lock-member holding wall
16 and 40 sliding inclined surfaces
17 a U-shaped wall
17a and 17b side walls
18 a through-hole
19 a flange
20 a holding groove
21 an O-ring
22 a backup ring
23 a connection portion
24 an operation portion
25 a lock member
25a a tip portion
25b a leg portion
26 a connection portion
27 an operation portion

What is claimed is:

1. A connector, comprising:
a cylindrical connector housing having through-holes extending in a circumferential direction formed on right and left;
a cylindrical male member including an opposing end with a tapered portion to be entered into an opposing end of the connector housing, and including a circumferential groove conforming with the through-holes in a state wherein the male member enters into the opposing end of the connector housing; and
an elastic lock member including an intermediate portion, and right-and-left leg portions projecting to right and left from the intermediate portion to be received into the through-holes,
wherein the cylindrical connector housing includes sliding inclined surfaces to be engaged with loose ends of the leg portions of the lock member provided on an outer periphery of the connector housing, and U-shaped walls provided on the outer periphery and surrounding the inclined surfaces to open upwardly, and the lock member takes an engagement position where the loose ends of the leg portions are positioned in proximal positions of the sliding inclined surfaces, and the leg portions enter into the circumferential groove inward from the through-holes; and a release position where the loose ends of the leg portions are positioned in distal positions of the sliding inclined surfaces, and respectively spread to open the leg portions against an elastic force of the lock member, and the leg portions escape toward the through-holes from the circumferential groove.

2. A connector according to claim 1, wherein the lock member is formed by a metal wire rod having elasticity.

3. A connector according to claim 1, wherein the outer periphery of the connector housing includes a holding wall controlling an axial direction displacement of the lock member.

4. A connector according to claim 1, wherein the intermediate portion of the lock member includes a portion bent in such a way as to project in an axial direction.

5. A connector according to claim 1, wherein the respective leg portions of the lock member include portions bent in an axial direction.

6. A connector according to claim 1, wherein the outer periphery of the connector housing includes inclined walls projecting from the outer periphery and defining the sliding inclined walls, and side walls connecting side portions of the inclined walls to the outer periphery.

7. A connector according to claim 1, wherein each of the sliding inclined surfaces has a curved surface.

8. A connector according to claim 1, wherein each of the U-shaped walls includes side walls and surrounds each of the inclined surfaces such that the side walls are spaced apart from each other in an axial direction of the connector housing to receive each of the inclined surfaces therebetween and open upwardly to pass each of the leg portions therethrough.

9. A connector according to claim 8, wherein the loose ends are surrounded by the side walls from front and back in the axial direction of the connector housing so as to prevent a deformation of the loose ends by an unintended external force and to reliably perform a release operation.

* * * * *